United States Patent
Iwamura et al.

(10) Patent No.: US 7,729,875 B2
(45) Date of Patent: Jun. 1, 2010

(54) LONG INFRASTRUCTURE MANAGEMENT SYSTEM AND PROGRAM

(75) Inventors: Kazuaki Iwamura, Nishitokyo (JP); Satoshi Yamaguchi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 11/666,339

(22) PCT Filed: Aug. 3, 2005

(86) PCT No.: PCT/JP2005/014196
§ 371 (c)(1), (2), (4) Date: Apr. 26, 2007

(87) PCT Pub. No.: WO2006/046342
PCT Pub. Date: May 4, 2006

(65) Prior Publication Data
US 2007/0260336 A1 Nov. 8, 2007

(30) Foreign Application Priority Data
Oct. 29, 2004 (JP) .............................. 2004-315004

(51) Int. Cl.
*G06F 19/00* (2006.01)
(52) U.S. Cl. ...................................................... 702/94
(58) Field of Classification Search ................... 702/94, 702/97; 707/10, 104.1
See application file for complete search history.

(56) References Cited

U.S. PATENT DOCUMENTS 6,728,730 B1 * 4/2004 Muro et al. .............. 707/104.1

FOREIGN PATENT DOCUMENTS

| JP | 10-38829 | 7/1996 |
| JP | 11-160335 | 11/1997 |
| JP | 11-258188 | 3/1998 |
| JP | 2000-187082 | 12/1998 |
| JP | 2003-185100 | 12/2001 |
| JP | 2002-357670 | 2/2002 |
| JP | 2004-37419 | 7/2002 |
| JP | 2004-139623 | 1/2004 |

OTHER PUBLICATIONS

International Search Report of PCT/JP2005/014196 mailed Nov. 15, 2005.

* cited by examiner

Primary Examiner—Bryan Bui
(74) Attorney, Agent, or Firm—Stites & Harbison PLLC; Juan Carlos A. Marquez, Esq.

(57) ABSTRACT

A long object management system for managing the history of the attribute data as well as the shape data constituting the temporal information of pipeline facilities, in which the future prediction is conducted by acquiring and managing the temporal information. The system comprises a unit for managing the time change data by the difference management of the pipeline shape and attribute data, and a unit for retrieving the time change data managed by difference, correcting the position using the result of retrieval and setting the correspondence between the time change data by correcting the data position.

10 Claims, 10 Drawing Sheets

PIPELINE DATA BEFORE SHAPE CHANGE

701 CROSS SECTIONAL IMAGE OF PIPELINE

COORDINATE (X1, Y1, Z1)
OR DISTANCE L1

COORDINATE (X2, Y2, Z2)
OR DISTANCE L1'

PIPELINE PORTION AFTER SHAPE CHANGE

702 CROSS SECTIONAL IMAGE OF PIPELINE

COORDINATE (X1', Y1', Z1')
OR DISTANCE L1'

COORDINATE (X2', Y2', Z2')
OR DISTANCE L2'

FIG.7B

703 RESULT OF DIRECT OVERLAY

FIG.7C

704 RESULT OF OVERLAY BY TRIAL AND ERROR

FIG.8A

801 PIPELINE DATA BEFORE SHAPE CHANGE
802 PIPELINE DATA AFTER SHAPE CHANGE

FIG.8B

| 803 COORDINATE DATA TABLE FORMAT | 804 TIME SERIES COORDINATE DATA TABLE FORMAT | |
|---|---|---|
| START TIME : T1 | START TIME : T1 | |
| (X1, Y1, Z1) | (X1, Y1, Z1) | |
| (X2, Y2, Z2) | (X2, Y2, Z2) | |
| (X3, Y3, Z3) | (X3, Y3, Z3) | |
| (X4, Y4, Z4) | END TIME : T2 | |
| | (X5, Y5, Z5) | INSERTED COORDINATES |
| | START TIME : T2 | |
| | (X6, Y6, Z6) | |
| | START TIME : T2 | |
| | (X7, Y7, Z7) | |
| | START TIME : T2 | |
| | (X8, Y8, Z8) | |
| | START TIME : T2 | |
| | (X4, Y4, Z4) | |

FIG.9A

901 ATTRIBUTE DATA BEFORE SHAPE CHANGE

| TIME | DISTANCE OF PORTION | PIPELINE NUMBER | GROUND LEVEL | .... | .... |
|---|---|---|---|---|---|
| .... | .... | .... | .... | .... | .... |
| 2000/ 7/ 27 | 3.56 | 23 | 12.57 | .... | .... |
| 2000/ 7/ 27 | 6.28 | 24 | 12.82 | .... | .... |
| 2000/ 7/ 27 | 4.39 | 25 | 13.56 | .... | .... |
| 2000/ 7/ 27 | 1.23 | 26 | 24.19 | .... | .... |
| .... | .... | .... | .... | .... | .... |

FIG.9B

902 ATTRIBUTE DATA AFTER SHAPE CHANGE

| TIME | ACCUMULATED DISTANCE | PIPELINE NUMBER | GROUND LEVEL | .... | .... |
|---|---|---|---|---|---|
| .... | .... | .... | .... | .... | .... |
| 2000/ 7/ 27 | 3.56 | 23 | 12.57 | .... | .... |
| 2000/ 10/ 9 | 6.28 | 24 | 10.36 | .... | .... |
| 2000/ 10/ 9 | 4.39 | 25 | 9.45 | .... | .... |
| 2000/ 7/ 27 | 1.23 | 26 | 24.19 | .... | .... |
| .... | .... | .... | .... | .... | .... |

FIG.9C

903 DIFFERENCE BASED MANAGEMENT OF ATTRIBUTE DATA

| TIME | ACCUMULATED DISTANCE | PIPELINE NUMBER | GROUND LEVEL | .... | .... |
|---|---|---|---|---|---|
| .... | .... | .... | .... | .... | .... |
| 2000/ 7/ 27 | 3.56 | 23 | 12.57 | .... | .... |
| 2000/ 7/ 27 | 6.28 | 24 | 12.82 | .... | .... |
| 2000/ 10/ 9 | 6.28 | 24 | 10.36 | .... | .... |
| 2000/ 7/ 27 | 4.39 | 25 | 13.56 | .... | .... |
| 2000/ 10/ 9 | 4.39 | 25 | 9.45 | .... | .... |
| 2000/ 7/ 27 | 1.23 | 26 | 24.19 | .... | .... |
| .... | .... | .... | .... | .... | .... |

FIG.10

LONG INFRASTRUCTURE MANAGEMENT SYSTEM AND PROGRAM

BACKGROUND OF THE INVENTION

This invention relates to a geographic information system (GIS), or in particular to a management system for long objects, for example pipelines to transport liquids and gases such as oil and natural gas.

Conventionally, the geographic information system has been used for management of city water works and natural gas facilities. A display technique is available, for example, by adding the measurement data of the cathodic protection potential and the pressure to the image of pipelines (for example, JP-A-2003-185100).

According to this technique, the measurement points are predetermined by identification (ID) numbers and correspond to the ID numbers on a system chart. Thus, the data acquired with a specified ID number are displayed. Also, the time change data can be acquired and displayed by designating the measurement points.

A technique to visually grasp the historical change of tunnels is also available (For example, JP-A-2004-37419). In this technique, a measurement point, with the corresponding data obtained based on the distance from the measurement point, are displayed on the map. Like in the first technique described above, each measurement point is designated by a number, and the coordinates of the measurement points acquired in advance have corresponding measurement point numbers. In accordance with the coordinates from the measurement points and the designated time, the information on such as a crack corresponding to the designated time can be displayed.

BRIEF SUMMARY OF THE INVENTION

In the prior art, a measurement point and the ID number or the coordinate thereof are assumed to be known for setting the data in correspondence. Based on this assumption, the time change information at the designated measurement point and the information corresponding to the designated time are displayed. Thus, the position error of the temporally measured data at the time of measurement is not taken into consideration.

Also, according to the prior art, the shape data and the attribute data can be held in the latest state whenever the facilities are renewed. The past data are managed as a history, while the occurrence of the position error is not taken into consideration. The prior art, therefore, takes it granted that the position information of a crack or the like obtained is accurate. As a result, the position of a crack, etc. measured in the past develops an error in the measurement method at a particular time point. In the case where the position information related to the time change data contains an error, the historical correspondence cannot be set, and therefore the future prediction is impossible. For example, a pipeline for transporting oil and gases is corroded on both the interior and exterior thereof. The corrosion will be escalated with time unless some preventive measures are taken. Unless the correspondence is set taking the position error into consideration, however, the escalation cannot be predicted. Also, the pipelines are settled according to the soil conditions (soft ground). This change can not be determined either without the historical record. The object of this invention is to provide a method in which the correspondence is set by obviating the position error of the time data and the future prediction of the corrosion and settlement of the pipeline facilities is conducted thereby to propose a hazardous place.

According to this invention, not only the shape data but also the attribute data are historically managed as the time change information of the pipeline, which is acquired and managed for future prediction. Also, a method is disclosed for the change difference management of the data to facilitate the data management.

The future prediction is possible by managing the temporal shape change and the temporal attribute change. For the pipeline facilities, the shape change of the pipelines due to the corrosion escalation and the ground settlement is the most critical item to be monitored. By managing this monitor item with the geographical information system, the change thereof can be predicted and analyzed thereby making possible a proposition corresponding to the particular place. This invention is applicable to viaducts and other roads as well as oil, natural gas and water facilities.

Other objects, features and advantages of the invention will become apparent from the following description of the embodiments of the invention taken in conjunction with the accompanying drawings.

BRIEF DESCRIPTION OF THE OF THE SEVERAL VIEWS OF THE DRAWINGS

DETAILED DESCRIPTION OF THE INVENTION

This invention is embodied by software on the computer. In particular, this invention is embodied by adding an image display device such as a display, a user instruction input device such as a keyboard or a mouse to the computer and retrieving, processing or displaying information while referring to the data displayed on the image display device of the computer.

A technique has been developed to manage the information related to facilities such as roads and underground pipes using the geographic information system. In this facility management system, the map information indicating the position of the facilities and the attribute information describing the time and method of constructing the facilities are managed. The map information are expressed by the figure data in the form of coordinates. The map information and the attribute information are so correlated that a figure is designated and a corresponding attribute is retrieved, or a figure is retrieved from an attribute. The time management is important for the management of the facility information. By inputting and managing the time when the facilities are constructed and inspected, the time of renewing the facilities can be confirmed. The time information is introduced as one of the attribute items. For future prediction, however, the history of the attribute data is required to be managed in addition to the time information.

With the change in the attribute data, the shape is also required to be changed. The shape and the attribute are changed simultaneously and managed in consistent form. In order to conduct this time change management of the shape and attribute of the facilities at the same time, this embodiment uses a temporal-spatial information system (also called the four-dimensional geographic information system: 4D-GIS) which can manage the steric and temporal change. In this temporal-spatial information system, the database (DB) for managing the shape data and the attribute data is managed as a geographic DB called the temporal-spatial DB. In managing such facilities as pipelines for transporting water, oil or natural gas, the need of partial change of the data occurs with the repair or renewal of a part of the facilities and the inspection. The partial data change is thus required. As long as the time change data can be managed, the future prediction is made possible using these data.

The future prediction requires correspondence between the shape change and the attribute change. This requires (1) the consistent correspondence between the shape and the attribute, or especially, the correct correspondence of the attribute to the shape, and (2) the consistency of the time change information with the position information. A means making possible the consistent correspondence is a method using the numbers and a method using the distance. In the method using the numbers, a unique number is attached to each portion of the facility figure depicted on the map, and the same number is attached to the attribute corresponding to the figure portion. Once the shape described on the map is designated, the number attached to the designated shape is referred to and the information of the same number in the attribute is retrieved and displayed. In the method of assuring correspondence using the distance, on the other hand, the attribute information are managed by the distance from a reference point (the initial distance and the final distance). Upon designation of a figure, therefore, the distance to the designated position is calculated, and the attribute information is retrieved with this distance as search key information.

Figure 1:
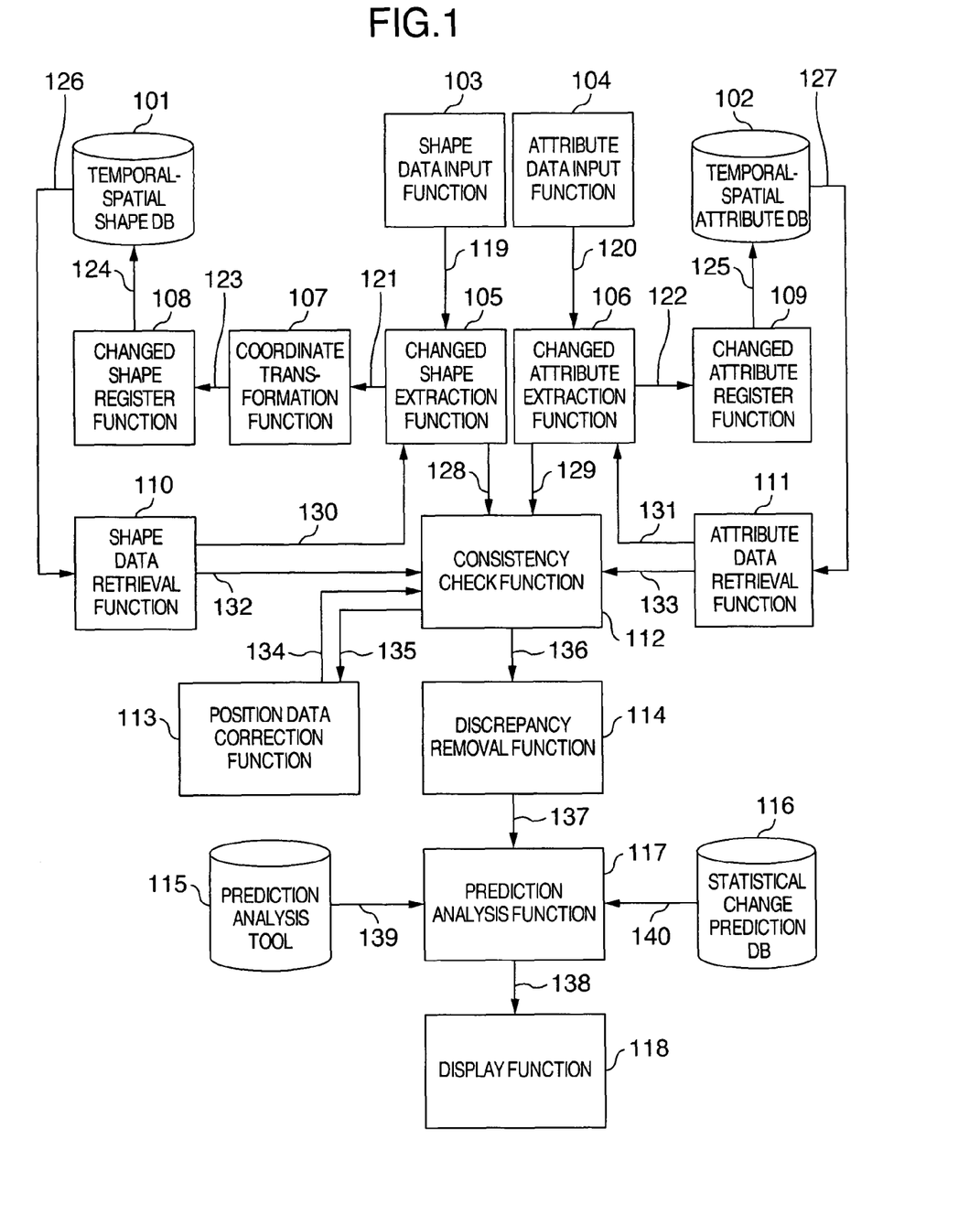
FIG. 1 A diagram showing a configuration of a temporal pipeline management GIS according to an embodiment of the invention.

The consistency of the time change information with the position information is maintained by the position coordinate or the distance. The shape data and the attribute data temporally managed are hereinafter called the temporal shape data and the temporal attribute data, respectively. In assuring correspondence using the numbers, the numbers are assigned in accordance with the position or the distance. The position and the distance, however, may fail to coincide due to an error unique to the measurement method involved. Further, the correspondence using the distance fails to coincide even at the portion not changed due to the distance error. In the case where the shape or the attribute is acquired, used and held as a history, therefore, the accurate correspondence of the temporal shape and attribute data is required on the assumption that the error due to the position or distance already exists. The configuration of the temporal-spatial GIS used for prediction and analysis by managing the time change data and correcting the position according to an embodiment is shown in FIG. 1.

(1) Temporal-Spatial Shape DB 101

This is a DB for storing and managing the shape data of a long object to be managed and the historical information thereof. In this case, the changed shape data, with the time information added thereto, is incorporated as a change difference into the shape data to be stored. In the case where the pipeline is handled, for example, the data configured of a polygonal line based on the coordinates row is managed.

(2) Temporal Attribute DB 102

This is a DB for temporally managing the attribute data. In this case, the changed attribute, with the changed time information added thereto, is incorporated as a change difference into the attribute data to be stored.

(3) Shape Data Input Function 103

This is the function to fetch the new shape data obtained by measurement and configured of coordinates. The shape data is acquired by a measuring instrument such as the GPS (global positioning system) or the total station.

(4) Attribute Data Input Function 104

This is the function to fetch the data of new facility attribute described in table by designating the row and column of the table.

(5) Changed Shape Extraction Function 105

The new shape data input from the shape data input function 103 is compared with the past shape data stored in the temporal-spatial shape DB 101 thereby to extract the change difference. Then, the time information at the time of the change is input and registered in a coordinate data structure.

(6) Changed Attribute Extraction Function 106

The attribute data acquired by the attribute data input function 104 is compared with the attribute data accumulated in the temporal-spatial attribute DB 102 to extract the changed portion, and in the case where the number of changes is small, the changed portion is additionally registered as a difference in the attribute data. In the case where the number of changes is large, on the other hand, whether it is employed as a new attribute data or not is determined. The time information at the time of change is input in the new attribute data.

(7) Coordinate Transformation Function 107

This is the function to transform the coordinate system using the affine transformation, for example, in the case where the coordinate system of the data on the change difference determined is different from the management coordinate system used as a reference in the temporal-spatial shape DB 101.

(8) Changed Shape Register Function 108

This is the function whereby the change difference data, with the time information added in the changed shape extraction function 105, is registered in the temporal-spatial attribute DB 101.

(9) Changed Attribute Register Function 109

This is the function whereby the change difference data determined in the changed attribute extraction function 106 is registered in the temporal-spatial attribute DB 102 with the time information added thereto.

(10) Shape Data Retrieval Function 110

This is the function to retrieve, from the temporal-spatial shape DB 101, the shape data corresponding to the time designated through an instruction input device or the like.

(11) Attribute Data Retrieval Function 111

This is the function to retrieve, from the temporal-spatial attribute DB 102, the attribute data corresponding to the time designated through the instruction input device or the like.

(12) Consistency Check Function 112

This is the function to determine whether the temporally-managed time change data are positionally consistent, by referring to the result of the position fitting operation conducted by the position data correction function 113 between the attribute data.

(13) Position Data Correction Function 113

This is the function to execute the offset process or the scaling process of the position information (position coordinate or distance) of the shape data or the attribute data while determining the relation between the time change data (the holding of the shape before and after change and the inclusion before and after corrosion) based on the relative positions thereby to correct the position coordinate or the distance providing the key information for the relating operation.

(14) Discrepancy Removal Function 114

This is the function to obviate the discrepancy of the inconsistent data (description error of the attribute data) upon determination of the legitimacy of the relative positions of the temporal shape or attribute data by the consistency check function 112 thereby to assure consistency of the data.

(15) Prediction Analysis Tool 115

This is a program library to register the prediction and analysis execution module for prediction of the pipeline corrosion escalation or analysis such as pipeline stress calculation.

(16) Statistical Change Prediction DB 116

This is the function to search and acquire the parameters required for prediction and analysis by reference to the past achievement to carry out the prediction and analysis with the prediction analysis tool.

(17) Prediction Analysis Function 117

This is the function to execute the prediction and analysis of the future shape change and attribute change by selectively loading the change analysis tool from the prediction analysis tool 115 using the temporal shape and attribute data.

(18) Display Function 118

This is the function to display the prediction and analysis result of the prediction analysis function 117 on the output data screen of the computer.

Figure 2:
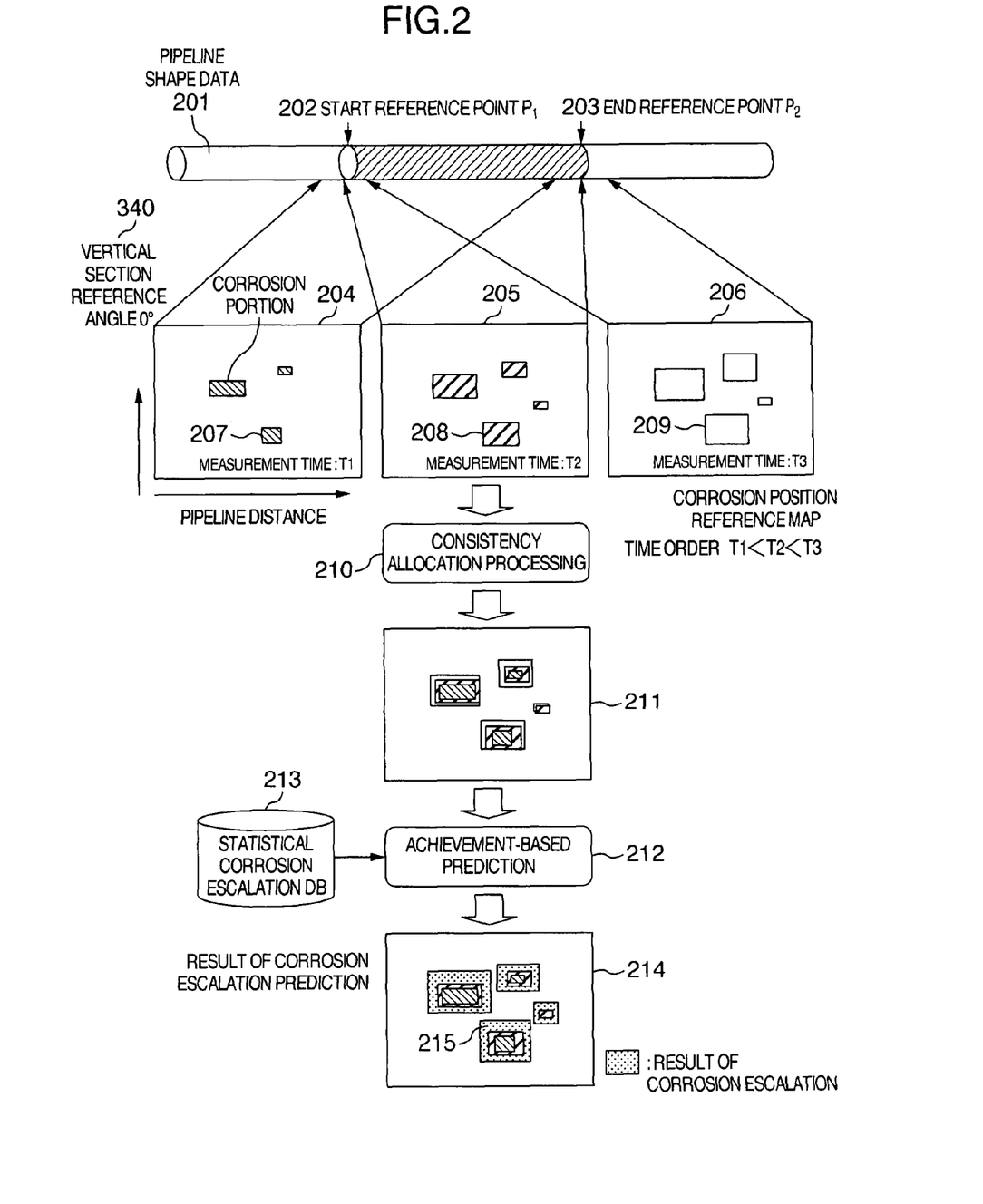
FIG. 2 A diagram for explaining the escalation prediction of the pipeline corrosion.
Figure 3A:
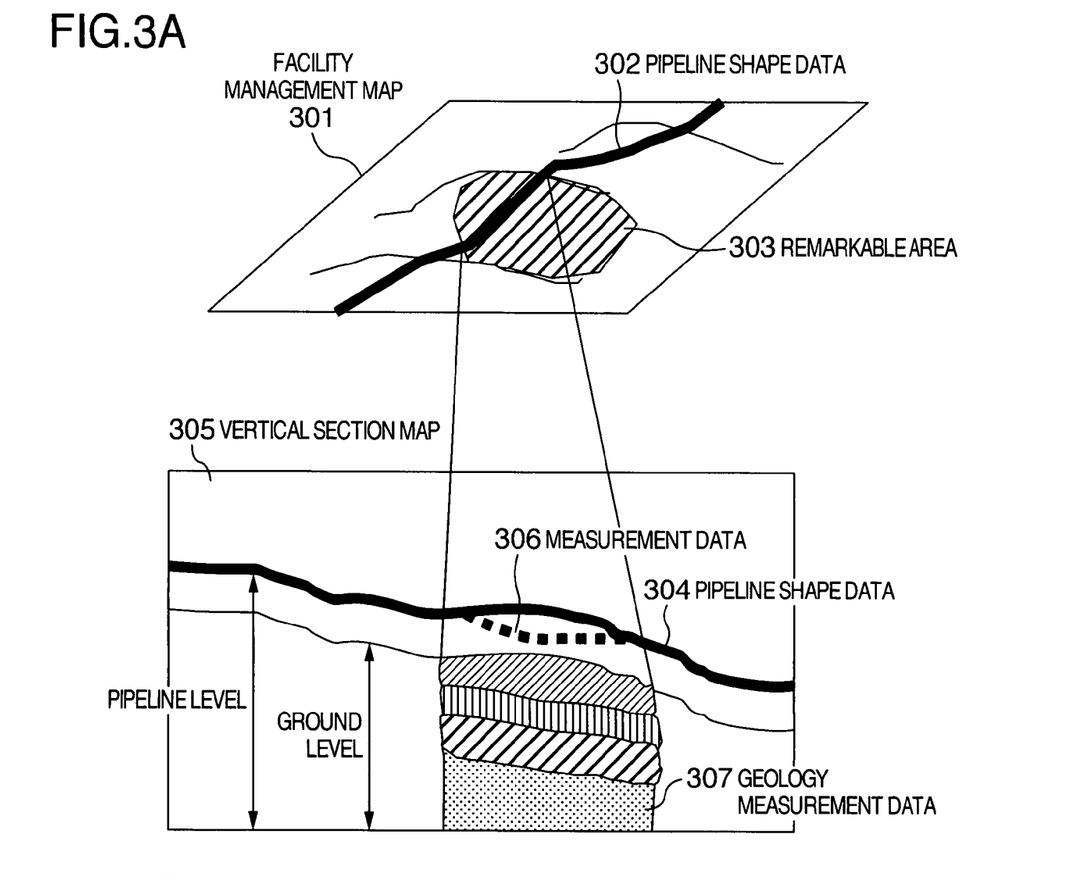
FIG. 3A An example of the facility management map for explaining the prediction of the pipeline shape change (shape change due to settlement), and a section image of a remarkable area on the facility management map.
Figure 3B:
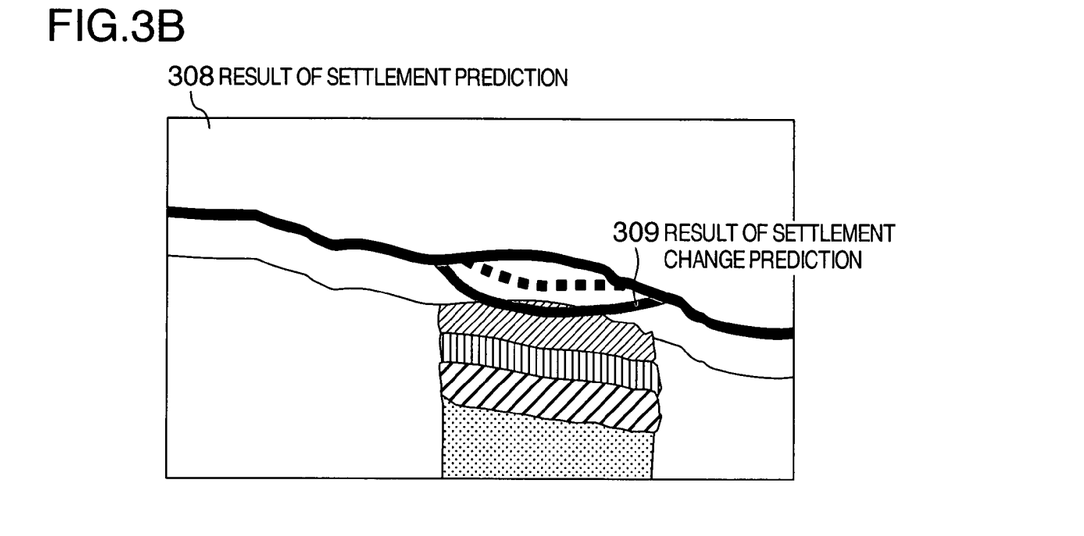
FIG. 3B A section image of the remarkable area showing the result of the settlement prediction.

Next, the corrosion escalation prediction of the pipeline facilities shown in FIG. 2 and the pipeline settlement prediction shown in FIGS. 3A and 3B are explained as a specific example of the prediction and analysis using the shape data and the attribute data temporally managed.

FIG. 2 shows a method of predicting the corrosion escalation of a pipeline. Corrosion position reference maps 204, 205, 206 having different acquisition time are shown as corresponding maps between point $P_1$, 202 (start reference point) and point $P_2$ (end reference point) of the pipeline shape data 201. The data indicating the progress of the corrosion escalation at the same position is expressed by, for example, external rectangles 207, 208, 209. These correspond to the pipeline distance, and generate a distance error at the time of acquisition. Since the corrosion continuity is secured by the consistency allocation processing 210, however, the temporal continuity is also secured. This is determined based on the fact that the old corrosion is included in the new corrosion (corrosion is escalated). The result of the consistency allocation processing 210 is shown by numeral 211, based on which the corrosion prediction is conducted by the achievement-based prediction 212 with reference to the statistical corrosion escalation DB 213 (identical with the statistical change prediction DB 116). The result of this corrosion prediction is shown by numeral 214. The result of the corrosion escalation corresponding to the corrosion data 207, 208, 209 is shown by numeral 215.

FIGS. 3A and 3B show a method of pipeline settlement prediction. In this case, a pipeline 302 and a remarkable area 303 are depicted on the facility management map 301 shown in the upper part of FIG. 3A. This remarkable area has a soft ground, and the pipeline included in this portion having the remarkable area is shown in the section image 305 shown in the lower part of FIG. 3A. In this case, the measurement data 306 of the pipeline shape set in position by the consistency process in the consistency check function 112 and the geological data section image data 307 are shown. Next, the result of the settlement prediction conducted using the pipeline shape data 304, 306 is shown by numeral 308 in FIG. 3B. The result of pipeline settlement prediction 309 is also shown.

Figure 4:
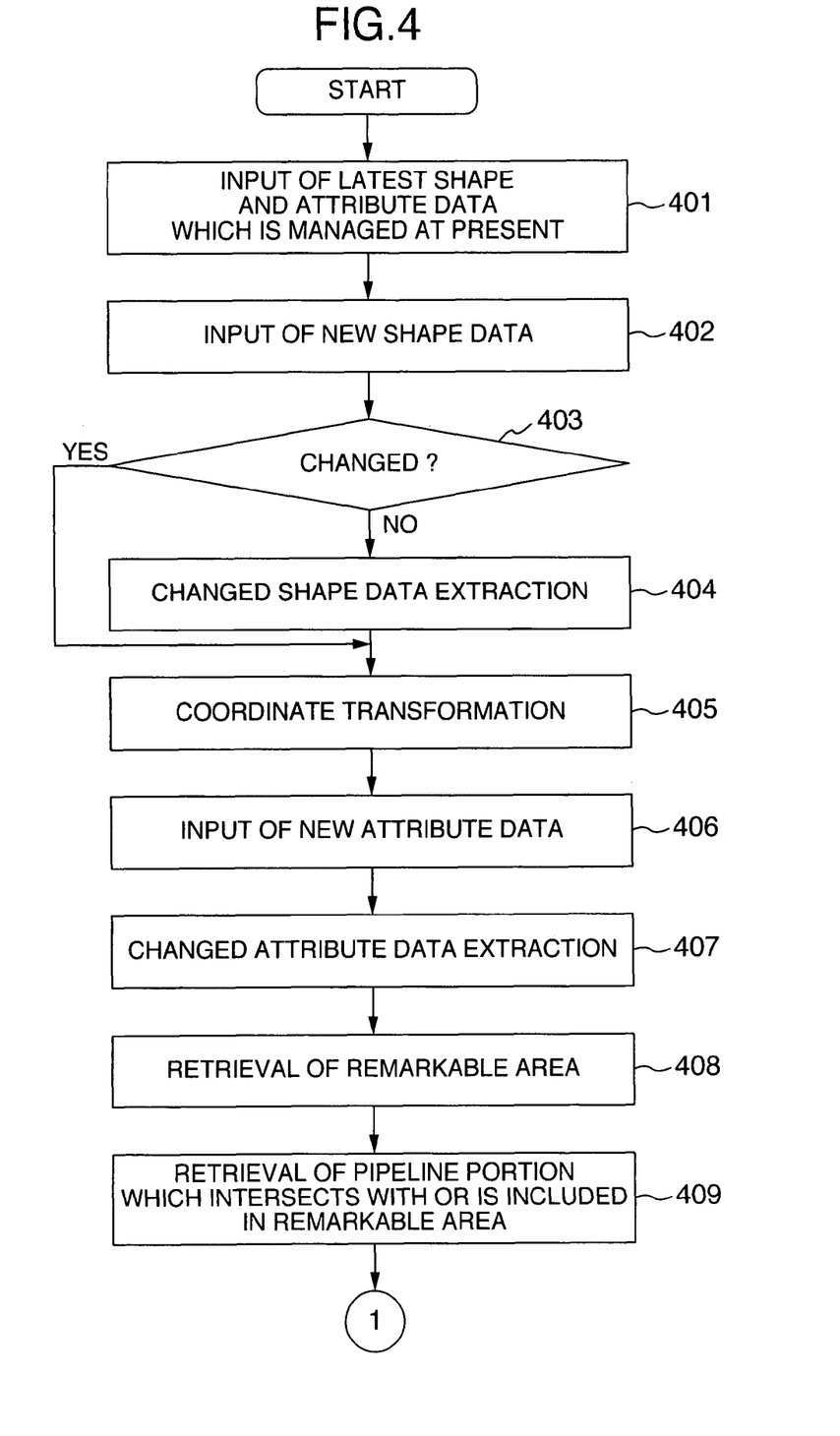
FIG. 4 A diagram showing the prediction and analysis flow using the temporal shape and attribute data according to an embodiment.
Figure 5:
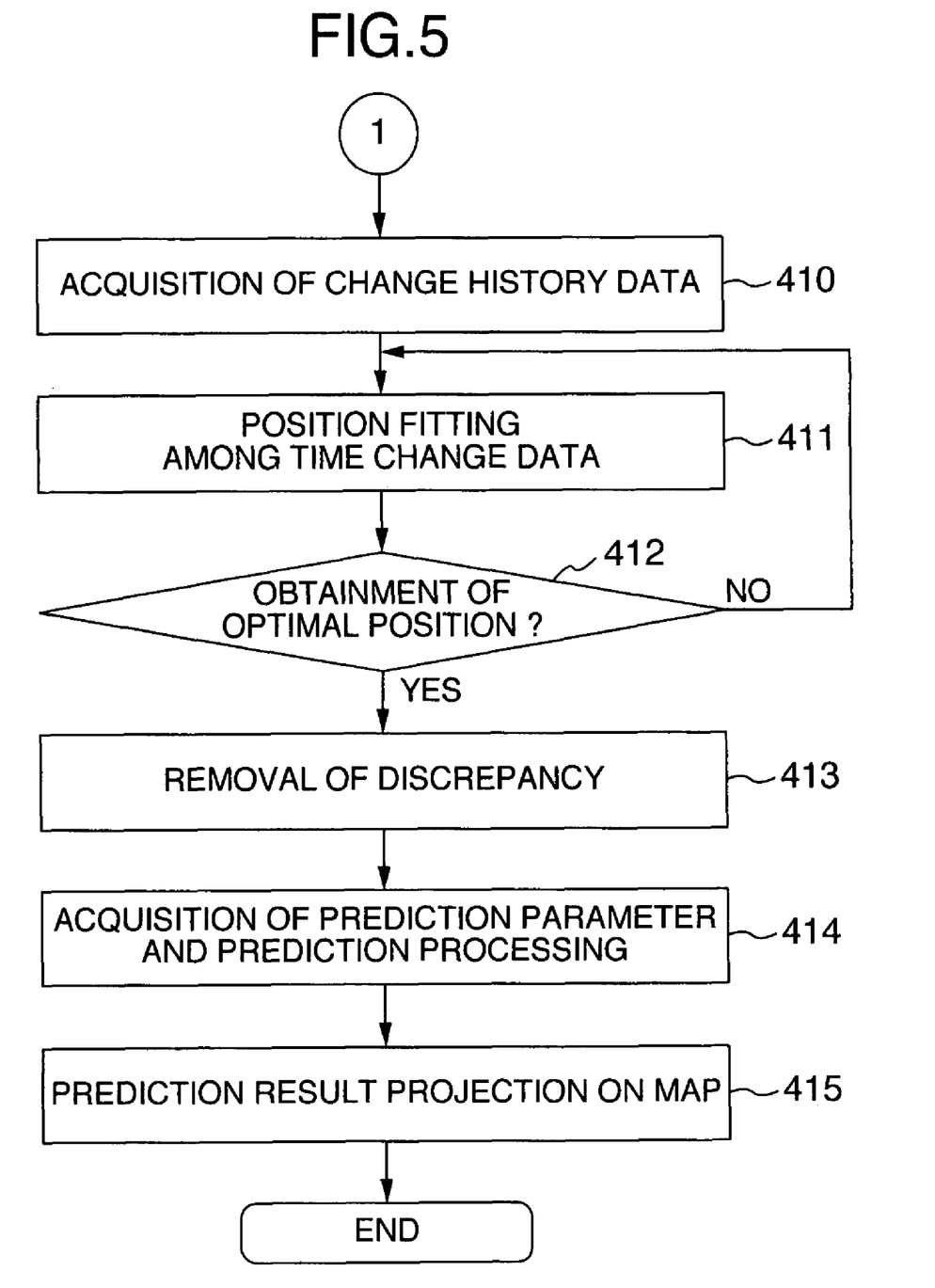
FIG. 5 A diagram showing the prediction and analysis flow using the temporal shape and attribute data according to an embodiment.

The processing flow according to the prediction and analysis method using the temporal shape data and the temporal attribute data with the functions of FIG. 1 are shown in FIGS. 4 and 5. The corrosion escalation prediction and the settlement prediction in the position fitting consistency process are shown in FIGS. 6 and 7A-7C.

At step 401, the latest shape and attribute data under management are input. The latest shape data and the latest attribute data for an arbitrary area are read from the temporal-spatial shape DB 101 and the temporal-spatial attribute DB 102, respectively, by the shape data retrieval function 110 and the attribute data retrieval function 111 (126, 127).

At step 402, the new shape data is input. The new shape data for an intended area is fetched by the shape data input function 103. This shape data represents only a changed portion or the shape of the whole including the changed portion.

At step 403, it is determined whether a change has occurred or not. It is determined whether the shape input at step 402 represents only the changed portion or the shape of the whole configuration including the change (arrow 119). For this purpose, the shape data retrieval function 110 searches the temporal-spatial shape DB 101 for the immediately preceding shape data, and the changed shape extraction function 105 compares the immediately preceding shape with the newly input shape (arrow 130) thereby to determine the presence or absence of a changed portion. Step 404 is executed for the shape of the whole configuration, and step 405 for the shape of a changed portion alone.

Figure 8A:
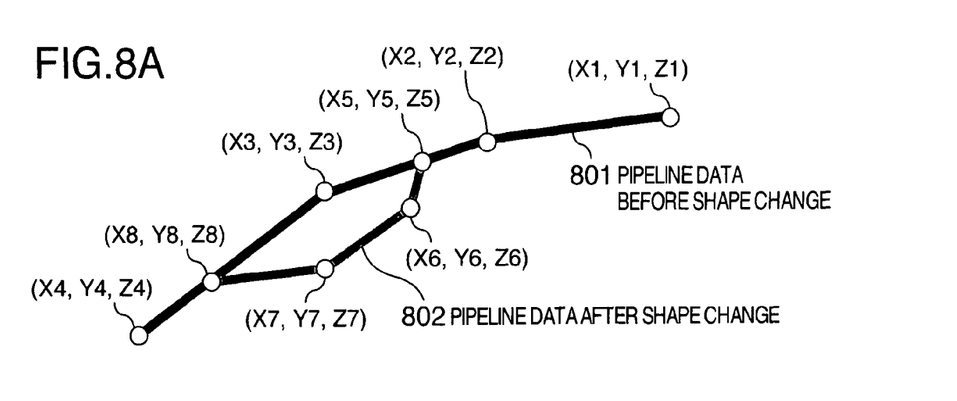
FIG. 8A A diagram showing an example of the shape data for explaining the method of shape difference change management according to an embodiment.
Figure 8B:
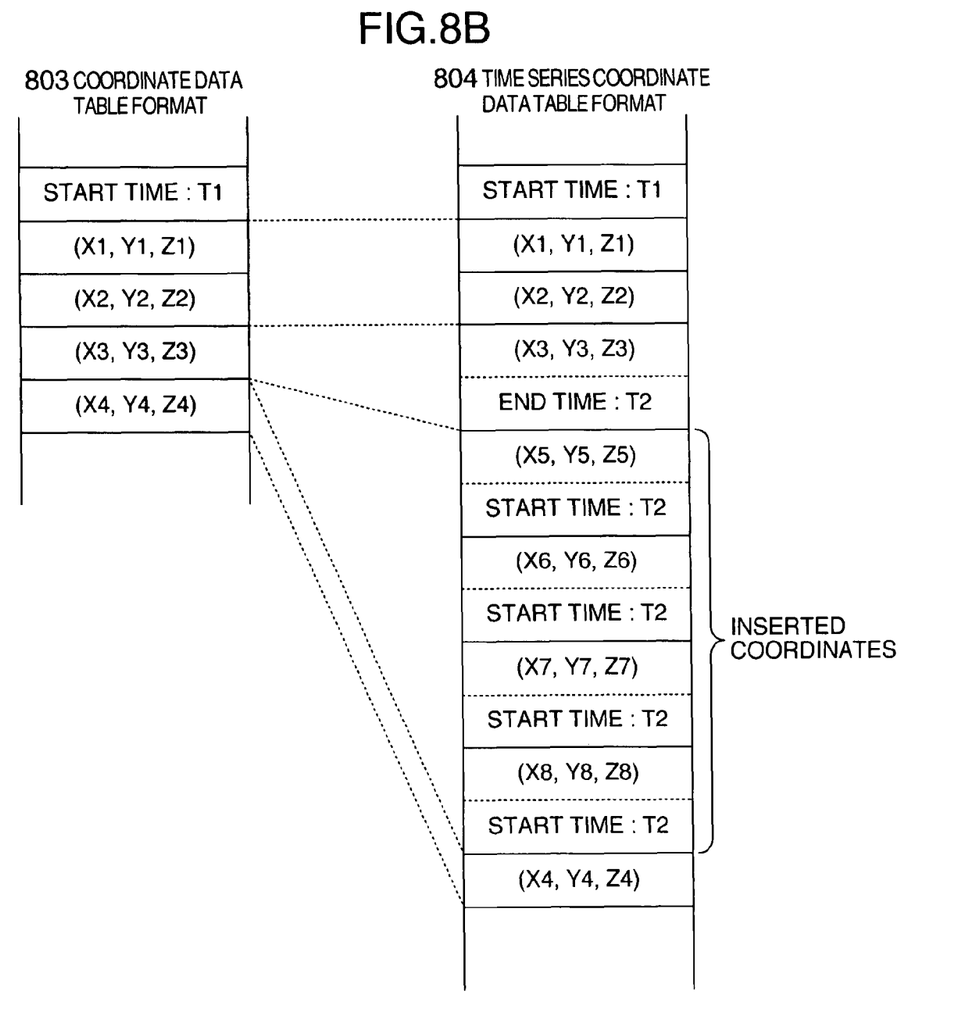
FIG. 8B A diagram for explaining the method of registering the shape coordinate data shown in FIG. 8A.

At step 404, the change in the shape data is extracted. The shape data on the changed shape extracted by the changed shape extraction function 105 is inserted into the shape data structure. FIGS. 8A, 8B show the method of inputting the change data. In this case, the original data, as shown in FIG. 8A, is the pipeline data 801 indicating the pipeline and configured of four coordinates (X1, Y1, Z1) to (X4, Y4, Z4). In this case, a change occurs between the coordinates (X2, Y2, Z2) and (X4, Y4, Z4), and the new shape data 802 including (X5, YS, Z5) to (X8, Y8, Z8) are inserted.

A method of registering the coordinate data is shown in the coordinate formats 803, 804 in FIG. 8B. In the coordinate data format 803, the coordinates are registered for the initial shape, and the coordinate data format 804 represents the shape after change. The coordinate data format 803 has registered therein the starting time T1 of the pipeline shape and the coordinates. The starting time T1 is the time at which the pipeline facilities are constructed. The time T2 included in the coordinate data format 803 indicates the time when the shape is changed by a landslide or the like. In the coordinate data format 804, the temporal change is indicated by registering, at the coordinate indicating the changed portion, the starting time T2 when the facilities become available. Also, (X13, Y3, Z3) is not effective at time T2, and therefore the final time T2 at which the coordinate becomes ineffective is added. By adding the time to each coordinate, a particular coordinate that has changed can be determined. With regard to the coordinates (X1, Y1, Z1), (X2, Y2, Z2), (X4, Y4, Z4) to which the time is not added, the effectiveness at and after time T1 is indicated by referring to the starting time attached to the data head. In the coordinate data format 804 registering the coordinates of the shape data 801 and the shape data 802, a temporal change is registered. By appropriately scaling from this coordinate data, therefore, the distance covered by the pipeline shape in the real world can be determined. Thus, the calculation of the pipeline stress is possible using this shape data. The changed shape register function 108 registers the data of the coordinate data format 804 in the temporal-spatial format DB 101 (arrows 123, 124).

At step 405, the coordinate is transformed. The input coordinate may be different from the managed coordinate in the temporal-spatial shape DB 101. In such a case, the coordinate transformation is conducted by the coordinate transformation function 107 (arrow 121). The coordinate is transformed by, for example, the affine transformation. In the case where the coordinate system of the coordinates for the changed shape is a local coordinate system varied from one area to another and the management coordinate system is a world coordinate system such as WGS-84, the coordinate transformation from the local coordinate system to the world coordinate system is required.

Figure 9A:
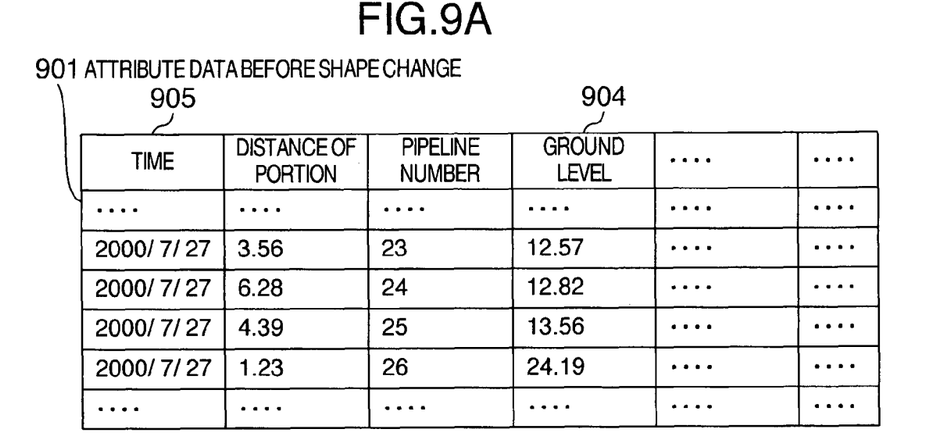
FIG. 9A A diagram showing an example of the attribute data before change for explaining the method of change difference management of the attribute data according to an embodiment.
Figure 9B:
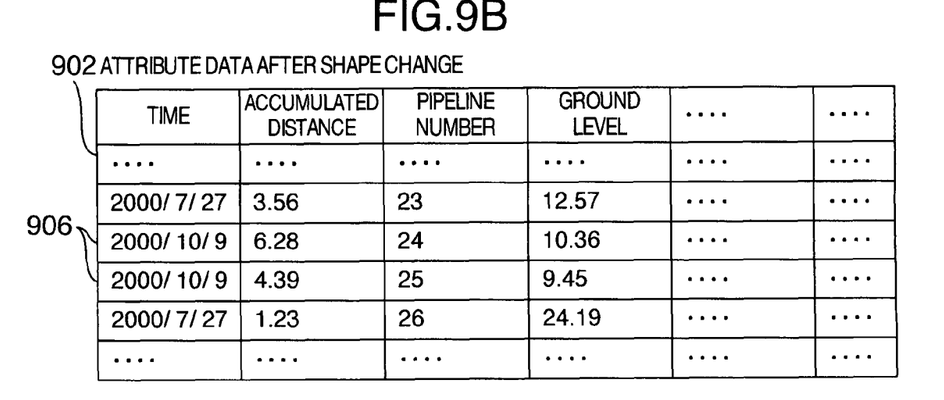
FIG. 9B The attribute data after change.

At step 406, the new attribute data is input by the attribute data input function 104. The management in table form is considered as an example of the method of managing the attribute data. An example of the attribute data is shown in FIG. 9. The attribute data 901 is the immediately preceding data, and numeral 902 designates the changed attribute data.

At step 407, the change in the attribute data is extracted. In the changed attribute extraction function 106, the recorded attribute data is compared with the pipeline number in the attribute data input from the attribute data input function 104, and it is determined whether any changed portion is included in the row data having the original pipeline number (arrows 120, 131). The change difference of the attribute data thus extracted is registered in the temporal-spatial attribute DB 102 by the attribute change register function 109 (arrows 122, 125).

Figure 9C:
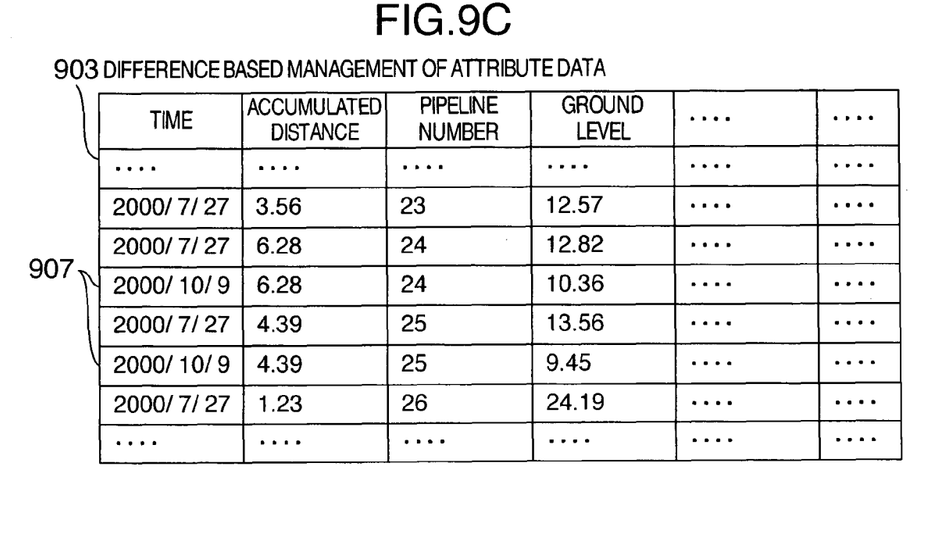
FIG. 9C The change data after change difference management.

A specific example of the change extraction is shown in FIGS. 9A to 9C. Each row data in table form is changed. The attribute data 901 before shape change shown in FIG. 9A contains the time information 905. Since the ground level 904 is changed for the pipeline numbers 24, 25, the data after shape change is input and updated together with the time information 906.

In the case where the pipeline facilities are as long as several thousands km or several tens of thousands km and the data are managed at intervals of several meters, a vast number of the pipeline attribute data are involved. Therefore, a method in which the new attribute data 902 is held each time one data is changed as shown in FIG. 9B, therefore, would result in a great waste since the management of a greater part of the vast data is always duplicated. Also, considerable time is consumed to retrieve the changed portion from the data, so that the collation and extraction of the changed data for the future prediction would require long time. Further, the time is consumed to display the change of the attribute data. For this reason, a method is considered in which the change is extracted by the batch process at the time of attribute data registration, and registered and managed as a difference. This facilitates the extraction of the time change data for prediction and analysis. In the case where there are only a small number of changed portions, therefore, the change difference is managed, while in the case where the changed portion covers the whole data, the new data is directly held. Further, the position consistency is secured with the corresponding time change data, and the future prediction carried out using the time change data.

Figure 10:
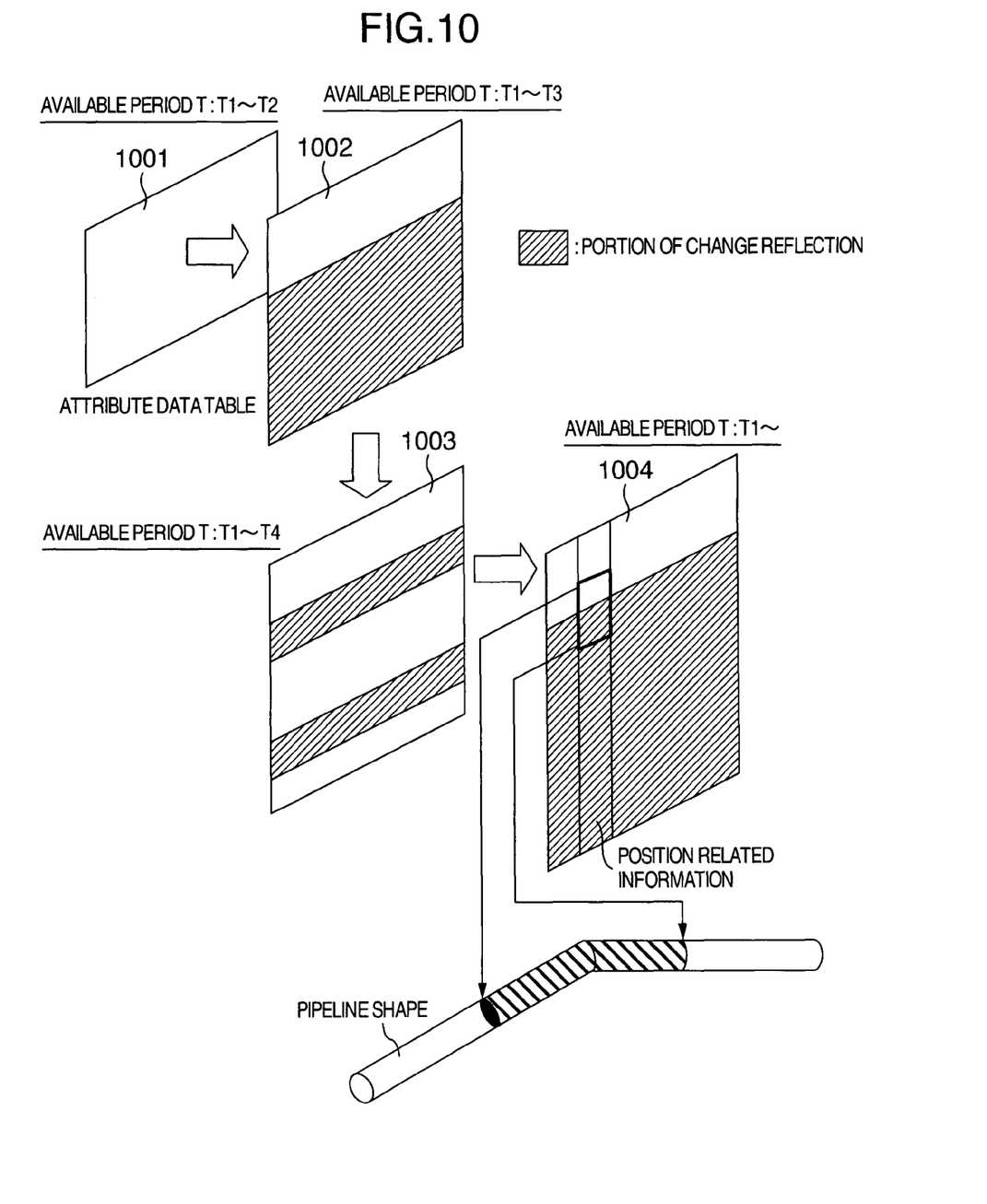
FIG. 10 A diagram showing the method of time change management of the attribute data according to an embodiment.

The table format data 903 shown in FIG. 9C represents the change data of which the difference is managed, and the row data 907 updated from the time/date 906 of 2004/10/09 is inserted. In updating the attribute data this way, the data of a plurality of rows may be updated. In the case where the data on the accumulated length is changed, for example, the accumulated length of other data is also changed. In this way, all the data subsequent to a specified row would be changed. In such a case, the difference management would require insertion of a vast number of rows of data. Therefore, the whole attribute data are replaced, as shown in FIG. 10.

First, the attribute data 1001 with the available time from T1 is managed. The attribute data 1002 having the available time of T1 to T3 are newly compared. In this case, many data subsequent to a specified row are changed. In the case where the row data in a greater number than a predetermined threshold are updated, for example, the replacement of all the data is introduced. Next, the attribute data subsequent to the available time of T3, which may be provided, is compared with the attribute data 1003. Since the data in a smaller number of rows than the threshold are changed, the difference is updated. In the case where the new attribute 1004 are further provided, the data of a greater number of rows than the threshold are updated by the comparison between the attribute data 1003 and the attribute data 1004. Therefore, the data is replaced with the whole attribute data 1004.

In managing the shape data and the attribute data temporally, the data would increase to a vast volume and considerable time would be consumed for history retrieval, if all the data are copied and held each time of change. Further, the changed portion would be required to be calculated each time of prediction and analysis. With the configuration according to this invention in which the data are managed by the difference as described above, in contrast, the data quantity is reduced while at the same time simplifying the process of prediction and analysis.

At step 408, a remarkable area is retrieved. For conducting the prediction analysis, the shape data retrieval function 110 retrieves a prediction range. In pipeline facilities, for example, an area constituting HCA (high consequence area) is retrieved as a remarkable area, and the pipeline portion including the particular area is detected. A specific example is shown in FIG. 3. In this case, the pipeline portion included in the remarkable area 303 is detected. With regard to the HCA data, the sampling data indicating the feature data of the area is given in advance. This sampling data is provided as discrete data, and therefore the sectional data is required to be estimated from this sampling data. Thus, the area is estimated by the method described below.

Assuming that the coordinate of the point desired to estimate is (X, Y), the value V is given as $$V = \Sigma \omega H(Xi, Yi)$$

$$\Sigma \omega i = 1$$

where H(X, Y) is the depth (height) of the soil at the coordinate (X, Y), and ω assumes the following value:

$$\omega = (1/Li)/(\Sigma 1/Li)$$

It is also possible to designate the weight value by classifying the point data by clinging.

In predicting the corrosion escalation, the corrosion-promoting soil area is retrieved. In predicting the pipeline settlement, on the other hand, the soft ground area is retrieved. This method is to configure the plane information from the information on the discrete sampling points. The land attribute information in the range where a predetermined area may constitute a remarkable area can also be easily set and input.

At step 409, the facility portion intersecting with and included in the remarkable area is retrieved. Further, in the shape data retrieval function 110, the pipeline portion included in the area data corresponding to the attribute calculated or selectively input at step 408 is retrieved. For this purpose, the pipeline is tracked, the intersecting point between the area boundary and the pipeline is calculated, and whether the intersecting section of the pipeline is included in the area is determined by calculation.

At step 410, the change history is acquired. In order to predict the temporal change of the data, the time range is preset or input through the input instruction means, and the shape data and the attribute data are read by the shape data retrieval function 110 and the attribute data retrieval function 111, respectively, thereby to generate the time change data (126, 127), as specifically explained below.

(1) Shape Data

The shape data included in the designated time range is input from the temporal-spatial shape DB 101, and the temporal coordinate is extracted from the shape data managed by the coordinate data format 804.

(2) Attribute Data

The attribute data contained in the designated time range is read from the temporal-spatial attribute DB 102, and the temporal attribute data are retrieved from the shape data managed, for example, by the attribute data 903.

At step 411, the temporal attribute data are set in position. The consistency check function 112 establishes correspondence between the temporal shape data and the temporal attribute data (arrows 128, 129, 130, 131).

At step 412, the optimum position is obtained. In the case where the consistency check function 112 determines that the shape and attribute data compared by distance are displaced, the position coordinate and the distance information are offset or scaled, so that the inclusion relation of the attribute data is adjusted (arrows 134, 135). Specifically, an offset is added to the new attribute data based on the shape/attribute data at a specified time.

An offset L[n] is added in four directions, i.e. an offset L is added in the following order:

$X[n+1]=X[n]+L[n], Y[n+1]=Y[n]$  Trial 1

$X[n+1]=X[n], Y[n+1]=Y[n]+L[n]$  Trial 2

$X[n+1]=X[n]-L[n], Y[n+1]=Y[n]$  Trial 3

$X[n+1]=X[n], Y[n+1]=Y[n]-L[n]$  Trial 4

The offset L[n] is reduced in value each time of trial as follows:

$$L[n+1]=L[n]-\delta$$

where δ is a constant value. By using a predetermined value progressively reduced in this way, the shape and attribute data are set in position, and the most coincident portion is searched for in the temporal attribute data. Further, the scaling magnification of the whole is set to A and the data coincidence is calculated while changing A in a specified range during each trial. Whether coincidence is achieved or not is determined by the coincidence of the unchanged portion or the inclusion relation. Upon determination that coincidence is achieved, step 413 is executed. Otherwise, step 411 is executed.

Figure 6:
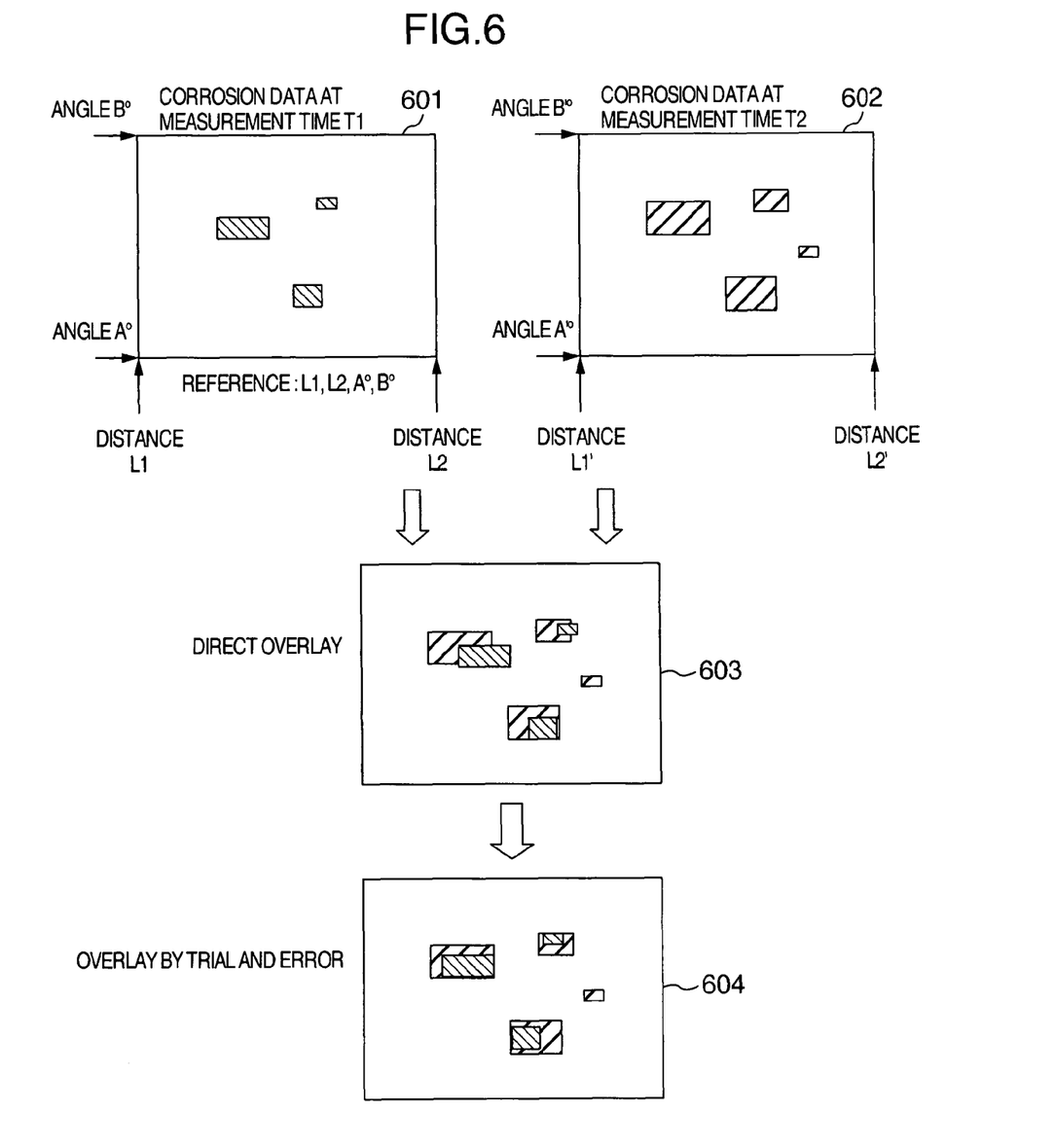
FIG. 6 An example of temporal corrosion data for explaining a method of setting the correspondence of the temporal corrosion data, the result of direct overlay of the data, and the result of data overlay by trial and error.

A method of determination is explained with reference to a specific example. FIG. 6 shows a position fitting method for corrosion escalation prediction. Even in the case where the temporal corrosion data 601, 602 are directly overlaid in the upper part of FIG. 6, coincidence cannot be achieved unless both the distance and angle information are accurate as designated by numeral 603 in the middle part of FIG. 6. Thus, the temporal corrosion data 601, 602 are overlaid one on the other by trial and error as described above, and the result indicated by numeral 604 in the lower part of FIG. 6 is obtained. As for the corrosion escalation prediction, coincidence is determined in the case where the inclusion relation of the whole image can be realized.

Figure 7A:
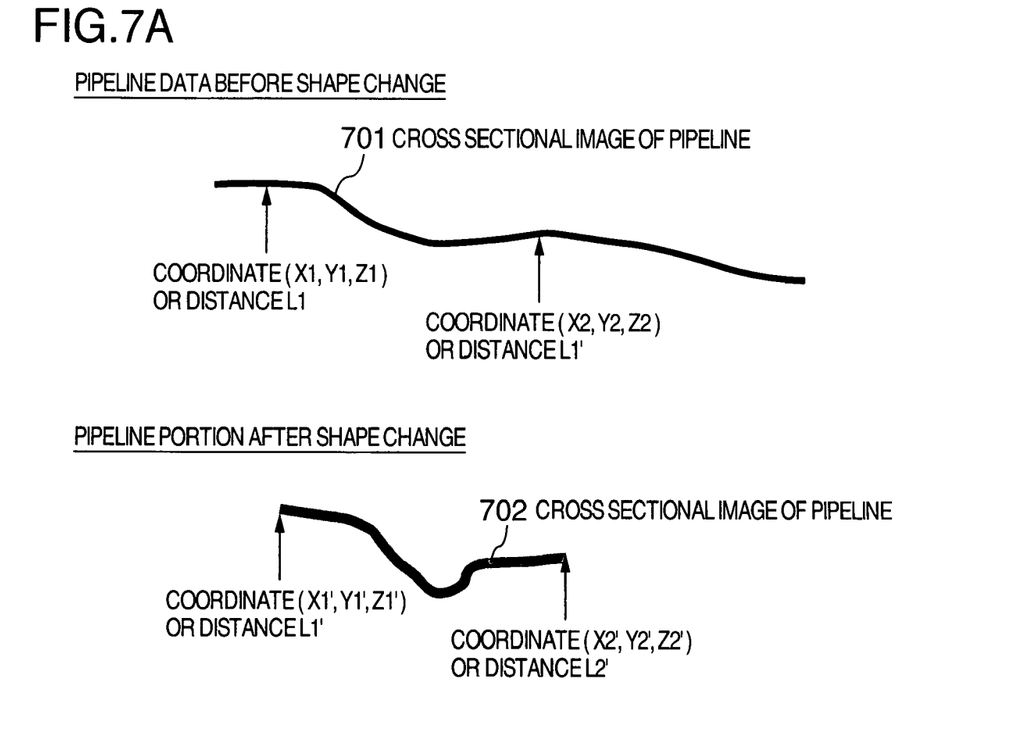
FIG. 7A An example of the temporal pipeline shape data for explaining the correspondence of the pipeline portion of changed shape.
Figure 7B:
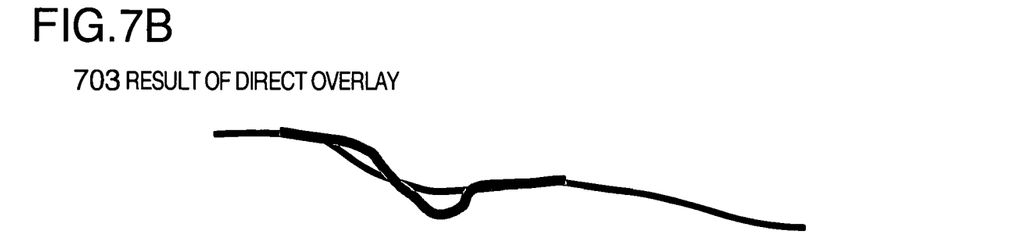
FIG. 7B The result of direct overlay of the data shown in FIG. 7A.
Figure 7C:
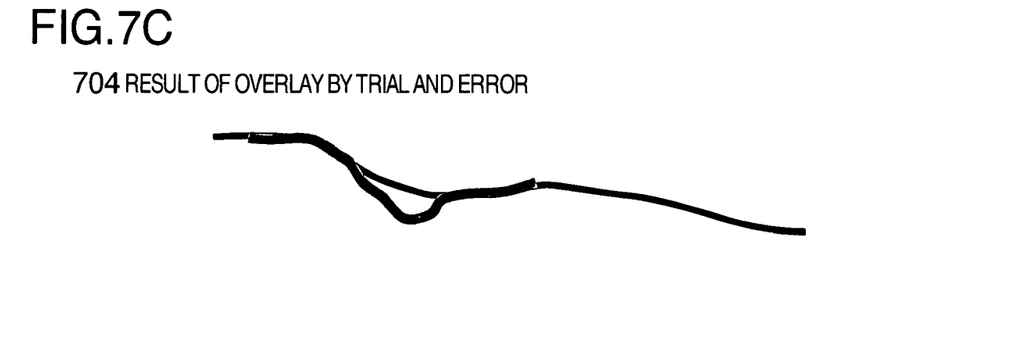
FIG. 7C The result of data overlay by trial and error.

FIG. 7 shows a position fitting method for settlement prediction. Even in the case where the temporal pipeline shape data 701, 702 are directly overlaid, coincidence cannot be achieved unless both the distance and angle information are accurate as designated by numeral 703. Thus, the temporal pipeline shape data 701, 702 are overlaid by trial and error as described above, and the result indicated by numeral 704 is obtained. In the process, the position fitting can be conducted by collating and checking the coincidence of the surrounding geography of the changed shape. Coincidence is determined in the case where the shape coincidence is obtained around the point of settlement prediction change.

At step 413, the discrepancy is removed. In the discrepancy removal function 114, the position relation or inclusion relation of the correspondence attribute is compared by the distance data corresponding to a predetermined attribute (arrow 136). In the case where the position relation or the inclusion relation contains a discrepancy as the time lapse of the attribute data, the particular discrepancy is removed or ignored. With regard to the corrosion data, for example, assume that the corrosion existing at time point T1 does not exist at time point T2, Where T1<T2. The corrosion existing at time point T1 as a discrepancy is removed or held. In the case where the number of data developing a discrepancy in the time flow is less than a predetermined threshold, such a corrosion is removed, and ignored otherwise. Also, the corrosion considered a discrepancy is managed by attaching the flag information indicating "possible discrepancy" or "reinspection required". By doing so, the information loss is prevented in the case where the absence of discrepancy is substantiated in the future inspection.

The prediction parameter is acquired and the prediction process executed at step 414. In the prediction analysis function 117, the prediction analysis program is selected by the prediction analysis tool 115, and the change is predicted using the change history of the shape data and the attribute data (arrows 137, 139, 140). The prediction analysis tool 115 has registered therein the analysis program (prediction analysis program) and a function list thereof. In the prediction analysis function, once the desired analysis is designated by the man-machine interface from the function list, the particular prediction analysis program is selected and accessed. An explanation is given taking the corrosion escalation prediction of FIG. 2 and the settlement prediction of FIG. 3 as an example.

FIG. 2 is a diagram for explaining the escalation of the corrosion data. The corrosion escalation is predicted in the following manner:

(1) In the Case where the Present and Preceding Corrosion Length Measurement Data are Used The escalation speed is determined from the corrosion escalation between the data acquired at two different time points in the present and preceding sessions. From the escalation speed, the change in corrosion length is calculated. Let Li (i=1, 2, 3, 4) be the corrosion length in four directions. Then, $$Li(t+\Delta t)=Li(t)+\Delta t*(Li(t)-Li(t_1))/(t-t_1)$$

where i=1, 2, 3, 4 (four directions), Li is the corrosion escalation length in direction i from the reference point at the center of the corrosion data of the preceding measurement, $\Delta t$ the time elapsed from the present time, t the present time, and $t_1$ the time of the preceding measurement.

(2) In the Case where the Corrosion Length Measurement Data of the Present Session, Preceding Session and the Preceding Session but One are Used The escalation acceleration is determined from the corrosion length based on the corrosion length data obtained in the present session, preceding session and the preceding session but one, and the speed change is determined from the acceleration. Specifically, the corrosion speed is determined from the difference of corrosion length between the present session, preceding session and the preceding session but one, and further, the corrosion acceleration is calculated from the two speed differences. Based on this acceleration, the prediction value of the corrosion speed at a designated time is determined, and the prediction value of the corrosion length is calculated.

First, the acceleration $\alpha$ is determined from the following equation:

$$\alpha=(Li(t)-Li(t_1))/(t-t_1)-(Li(t_1)-Li(t_2))/(t_1-t_2))/(t-t_2)$$
(i=1, 2, 3, 4: four directions)

$$Vi(t+\Delta t)=Vi(t)+\Delta t*\alpha \text{ (i=1, 2, 3, 4; four directions)}$$

$$Li(t+\Delta t)=Li(t)+\Delta t*Vi(t+\Delta t) \text{ (i=1, 2, 3, 4; four directions)}$$

where Li(t) is the corrosion escalation length at time t in direction i from the reference point at the center of the corrosion data of the preceding measurement but one, $\Delta t$ the time elapsed from the present time, t the present time, $t_1$ the time of the preceding measurement, and $t_2$ the time of the preceding measurement but one.

In the case where other past statistical measurement data are available, the change parameter is acquired using the past achievement statistics. First, with regard to the designated remarkable range, the soil data, the related corrosion escalation acceleration and the speed parameter are retrieved from the statistical change prediction DB 116. With regard to the corrosion, the corrosion escalation corresponding to the material and the soil acidity can be predicted. Suppose the corrosion proceeds at the acceleration rate a and the speed v for the soil A. Then, the corrosion speed is calculated by substituting the above-mentioned equation.

In the pipeline shape change shown in FIG. 3, an area considered hazardous is retrieved from the soil data. Especially, the area having a soft ground as a data is selected, and the soil data registered beforehand in the statistical change prediction DB 116 for the particular range of area is mapped. From the escalation of this geology, the pipeline portion (range) involving the soft ground is retrieved. Next, the attribute data is retrieved from the distance information of the particular pipeline, and so is the pipeline height information. In the case where the height data is contained in the shape data, the related height information is retrieved. Next, the height change is calculated from the height data history.

(1) In the Case where the Present and Preceding Depth Measurement Data are Used

The settlement speed is determined from the pipeline depth acquired at two different time points, present and preceding measurement sessions, for example. From this settlement speed, the change in the pipeline settlement depth is calculated.

$$Hi(t+\Delta t)=Li(t)+\Delta t\cdot(Hi(t)-Hi(t_1))/(t-t_1)$$

where Hi is the settlement length from the pipeline depth obtained in the preceding measurement, $\Delta t$ the time elapsed from the present time, t the present time, and $t_1$ the time of the preceding measurement.

(2) In the Case where the Depth Measurement Data Obtained by the Present Measurement, Preceding Measurement and the Preceding Measurement but One are Used The settlement acceleration is determined from the depth data obtained in the present measurement, preceding measurement and the preceding measurement but one, and the settlement speed change is determined from the settlement acceleration. Specifically, from the depth difference between the present measurement, preceding measurement and the preceding measurement but one, the settlement speed for each session is determined. Further, from the two speed differences, the settlement acceleration is calculated. Based on this acceleration, the prediction speed value at a designated time is determined, and the prediction value of settlement is calculated. First, the acceleration $\alpha$ is determined from the following equation:

$$\alpha=(Hi(t)-Hi(t_1))/(t-t_1)-(Hi(t_1)-Hi(t_2))/(t_1-t_2))/(t-t_2)$$

$$Vi(t+\Delta t)=Vi(t)+\Delta t\cdot\alpha$$

$$Hi(t+\Delta t)=Hi(t)+\Delta t\cdot Vi(t+\Delta t)$$

where Hi(t) is the settlement length from the pipeline depth measured in the preceding session as a reference point, Vi(t) the settlement speed, $\Delta t$ the time elapsed from the present time, t the present time, $t_1$ the time of the preceding measurement, and $t_2$ the time of the preceding measurement but one. By calculating H in this way, the settlement position can be determined.

With regard to the pipeline settlement prediction, the settlement speed can be calculated by retrieving the relation between the soil data registered in the statistical change prediction DB 116, the settlement speed v and the acceleration $\alpha$.

At step 415, the prediction result is reflected on the map. The prediction result obtained by the method of step 414 is displayed (arrow 138). Thus, the corrosion range and the escalation prediction result thereof can be displayed. With regard to the pipeline corrosion escalation, the corrosion escalation prediction result as designated by numerals 214, 215 are displayed. Together with the prediction result, the width and length of the corrosion escalation are also displayed. Especially, by displaying the temporal corrosion escalation in overlaid relation, the escalation can be easily displayed.

With regard to the prediction of the pipeline settlement and the progress thereof using the vertical section image as shown in FIGS. 3A, 3B, the pipeline settlement change can be displayed in the vertical section image 308. The prediction result is also displayed to display the settlement depth. Further, using the present pipeline depth and the pipeline shape after settlement, the pipeline stress can be analyzed. The stress analysis can be carried out by the finite element method (FEM). The direction in which the pipeline is moved, the magnitude of movement and the pipeline material can be given as parameters. The pipeline material is managed as an attribute. This is equivalent to the fact that the parameter of the covered distance (shape change parameter) and the elasticity of the pipeline material are determined as initial data from the displacement of the pipeline, and using the conditions for equilibrium between partial forces, the load value for each part of the pipeline is determined. This load value is calculated as a stress for each part by dividing a cylindrical pipeline into triangles, and determining the value of each triangle.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A long object management system comprising:
   a shape data storage unit for storing a plurality of shape data sets on a long object corresponding to time data of a plurality of time data;
   an attribute data storage unit for managing a plurality of attribute data sets of the long object corresponding to time data of the plurality of time data;
   a data correction unit for correcting position coordinate data or distance data of selected shape data sets of the plurality of shape data sets corresponding to different time data of the plurality of time data and of selected attribute data sets of the plurality of attribute data sets corresponding to different time data of the plurality of time data such that error in the distance data corresponding to each of the different time data is corrected; and
   a display unit for displaying the corrected error in the distance data with the selected shape data sets or the selected attribute data sets overlaid one on another.

2. A long object management system as described in claim 1, further comprising:
   a consistency check unit for determining the consistency of the result from the data correction unit; and
   a discrepancy removal unit for editing the data or setting a flag based on the result of inconsistency obtained from the consistency check unit.

3. A long object management system as described in claim 1, wherein the shape data storage unit and the attribute data storage unit are managed with time information corresponding to a change difference.

4. A long object management system as described in claim 1, further comprising:
   an input function for new shape data and an input function for new attribute data;
   a shape extraction function for extracting the difference data between the new shape data and the stored shape data sets; and
   an attribute extraction function for extracting the difference data between the new attribute data and the stored attribute data sets;
   wherein the shape data storage function and the attribute data storage function store the outputs from the shape extraction function and the attribute extraction function, respectively.

5. A long object management system as described in claim 1, wherein the long object is a pipeline, and the attribute data of the attribute data sets relates to corrosion.

6. A long object management system comprising:
   a shape data storage unit for storing a plurality of shape data sets on a long object corresponding to time data of a plurality of time data;
   an attribute data storage unit for managing a plurality of attribute data sets of the long object corresponding to time data of the plurality of time data;
   a data correction unit for correcting position coordinate data or distance data of selected shape data sets of the plurality of shape data sets corresponding to different time data of the plurality of time data and of selected attribute data sets of the plurality of attribute data sets corresponding to different time data of the plurality of time data such that error in the distance data corresponding to each of the different time data is corrected; and
   a display unit for displaying the corrected error in the distance data with the selected shape data sets or the selected attribute data sets overlaid one on another; and
   a prediction analysis function for predicting and analyzing shape data or attribute data using the corrected shape data sets or attribute data sets, wherein the display unit also displays the predicted shape data or attribute data overlaid one on another.

7. A long object management system as described in claim 6, wherein the prediction analysis function conducts prediction and analyses using a prediction analysis tool stored in the storage function.

8. A long object management system as described in claim 6, wherein the prediction analysis function conducts the prediction by acquiring the change speed and the change acceleration between the selected shape data sets or between the selected attribute data sets corrected with corresponding different time points.

9. A long object management system as described in claim 6, wherein land attribute information is set with a corresponding arbitrary range, and the prediction analysis function selects a long object in a range corresponding to the set land attribute information and conducts the prediction for the selected long object.

10. In a system comprising a shape data storage function for storing the long object shape data with a corresponding time data and an attribute data storage function for managing the long object attribute data with the corresponding time data,
    a program for correcting the correspondence between the positions of the shape data corresponding to different time data read from the shape data storage function, wherein said program executes the process of:
    correcting the correspondence between the positions of the attribute data corresponding to different time data read from the attribute data storage function,
    obviating the discrepancy by determining the legitimacy of correction,
    predicting the future shape data or attribute data using the corrected shape data or attribute data, respectively, and
    executing the process of displaying the shape data or the attribute data with corresponding different time data in overlaid relation with the prediction result on the display function.

* * * * *